(12) United States Patent
Onizuka et al.

(10) Patent No.: US 7,159,688 B2
(45) Date of Patent: Jan. 9, 2007

(54) ELECTRIC POWER STEERING DEVICE

(75) Inventors: Toshiyuki Onizuka, Maebashi (JP); Kazuo Chikaraishi, Maebashi (JP); Shuji Endo, Maebashi (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/510,373

(22) PCT Filed: Mar. 28, 2003

(86) PCT No.: PCT/JP03/04002

§ 371 (c)(1),
(2), (4) Date: Oct. 5, 2004

(87) PCT Pub. No.: WO03/086837

PCT Pub. Date: Oct. 23, 2003

(65) Prior Publication Data

US 2005/0217923 A1    Oct. 6, 2005

(30) Foreign Application Priority Data

Apr. 15, 2002 (JP) .............................. 2002-111609
Aug. 15, 2002 (JP) .............................. 2002-236846

(51) Int. Cl.
*B62D 5/04* (2006.01)

(52) U.S. Cl. ..................................... 180/444

(58) Field of Classification Search ................ 180/443, 180/446
See application file for complete search history.

(56) References Cited

U.S. PATENT DOCUMENTS

| 4,681,182 | A |   | 7/1987  | Suzuki et al. |
| 5,003,836 | A | * | 4/1991  | Mitsugu et al. ................ 74/425 |
| 5,979,587 | A |   | 11/1999 | Liubakka et al. |
| 6,384,557 | B1| * | 5/2002  | Weber et al. ................ 318/444 |
| 6,400,278 | B1| * | 6/2002  | Weyerstall et al. ....... 340/686.3 |
| 6,498,451 | B1| * | 12/2002 | Boules et al. ................ 318/661 |
| 2002/0035877 | A1 | * | 3/2002 | Tokumoto .............. 73/862.333 |

FOREIGN PATENT DOCUMENTS

| EP | 964126 A2 | * | 12/1999 |
| JP | 62-85764 A  |   | 4/1987  |
| JP | 09-156526 A |   | 6/1997  |
| JP | 2000-128003 A |  | 5/2000  |
| JP | 2002-53054 A  |  | 2/2002  |
| JP | 2002-64955 A  |  | 2/2002  |
| JP | 2002-81961 A  |  | 3/2002  |
| JP | 2003-329436 A |  | 11/2003 |

* cited by examiner

*Primary Examiner*—Kevin Hurley
(74) *Attorney, Agent, or Firm*—Sughrue Mion, PLLC

(57) ABSTRACT

In an electric power steering apparatus that urges a steering shaft or a rack shaft with an assist load using the drive force of a motor by a transmission mechanism via reduction gears, the reduction gears includes a rotation angle sensor assembled integrally therewith.

8 Claims, 10 Drawing Sheets

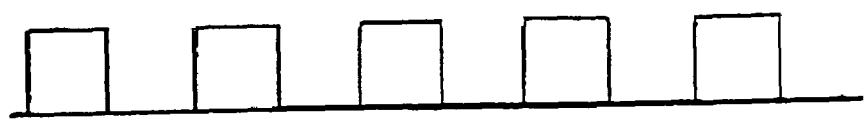
FIG. 2
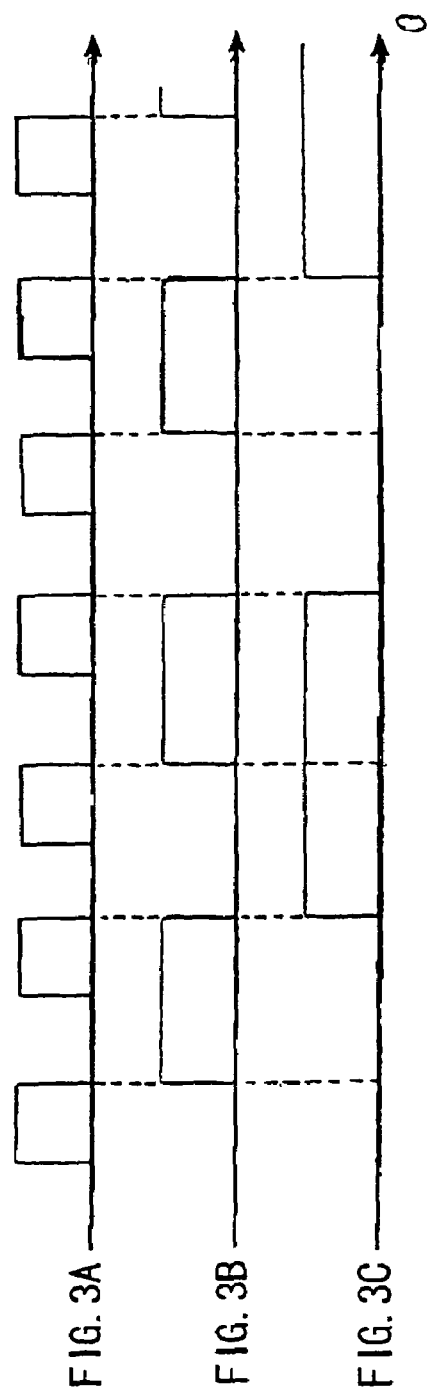
FIG. 3A
FIG. 3B
FIG. 3C

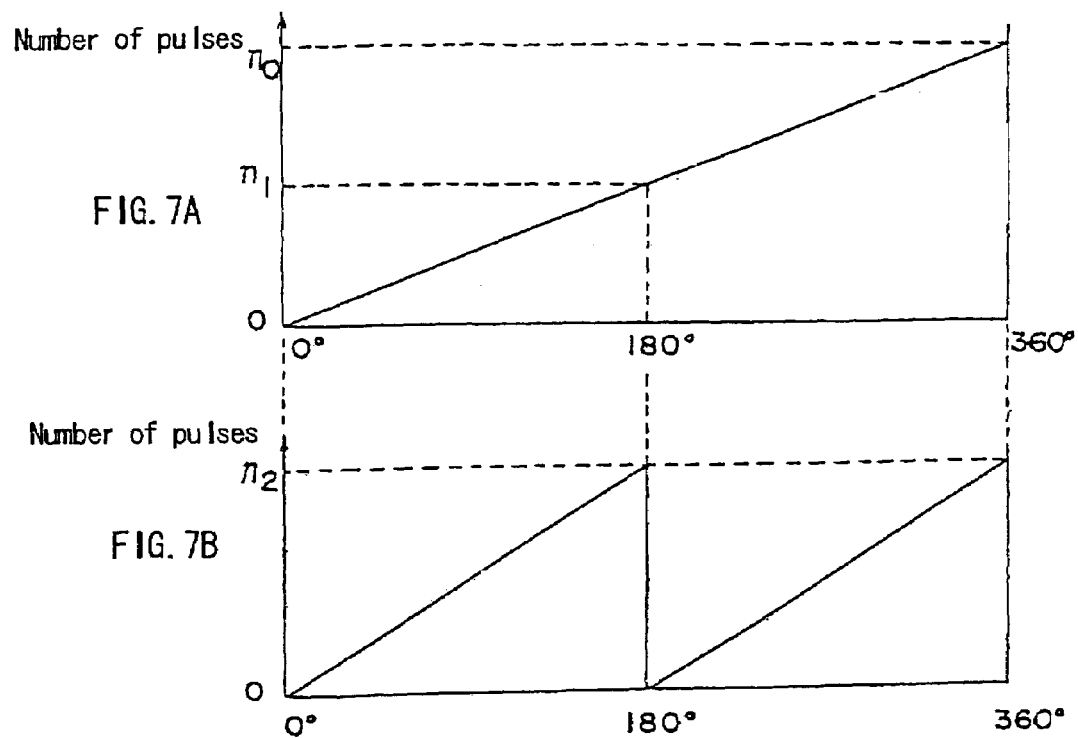
FIG. 7A
FIG. 7B
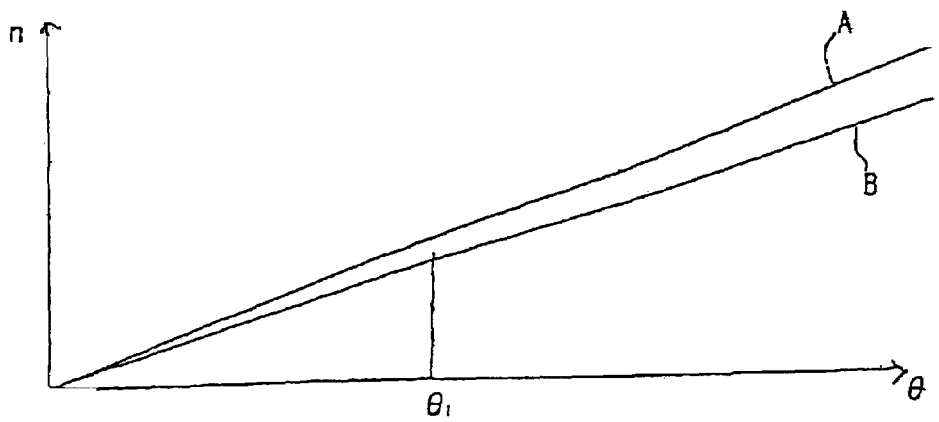
FIG. 8

ELECTRIC POWER STEERING DEVICE

TECHNICAL FIELD

The present invention relates to an electric power steering apparatus that urges a steering system of automobiles or vehicles with a steering assist force by a motor, and more particularly, to a compact electric power steering apparatus having a rotation angle sensor assembled to a reduction gear portion integrally therewith.

BACKGROUND ART

An electric power steering apparatus, which urges a steering apparatus of an automobile or a vehicle with an assist load using the rotational force of a motor, auxiliarily applies the drive force of the motor to a steering shaft or a rack shaft through a transmission mechanism such as gears or belts via reduction gears. Such a conventional electric power steering apparatus executes a feedback control of a motor current for accurately generating an assist torque (a steering assist torque). The feedback control is to adjust a motor application voltage so as to reduce a difference between a current command value and a motor current detection value. The motor application voltage is generally adjusted based on a duty ratio of pulse width modulation (PWM) control.

A general structure of the electric power steering apparatus will be explained below with reference to FIG. 12. A shaft 2 of a steering wheel 1 is connected to a tie rod 6 of running wheels through reduction gears 3, universal joints 4a and 4b and a pinion rack mechanism 5. The shaft 2 is provided with a torque sensor 10 for detecting a steering torque of the steering wheel 1. A motor 20 for assisting the steering force of the steering wheel 1 is connected to the shaft 2 through the reduction gears (speed reducer) 3. A control unit 30 for controlling the power steering apparatus is supplied with power from a battery 14 through an ignition key 11 and a relay 13. The control unit 30 calculates a steering assist command value I of an assist command based on a steering torque T detected by the torque sensor 10 and a vehicle speed V detected by a vehicle speed sensor 12. The control unit 30 then controls a current to be supplied to the motor 20 based on the calculated steering assist command value I.

The control unit 30 is mainly composed of a CPU. FIG. 13 shows general functions to be executed based on a program inside the CPU. For example, a phase compensator 31 does not show a phase compensator as independent hardware and shows a phase compensation function executed by the CPU.

Functions and operation of the control unit 30 will be explained below. A steering torque T detected by the torque sensor 10 and then input thereby is phase-compensated by a phase compensator 31 for increasing the stability of the steering system. The phase-compensated steering torque TA is inputted to a steering assist command value calculator 32. A vehicle speed V detected by the vehicle speed sensor 12 is also inputted to the steering assist command value calculator 32. The steering assist command value calculator 32 determines a steering assist command value I as a control target value of the current to be supplied to the motor 20, based on the inputted steering torque TA and the input vehicle speed V. The steering assist command value I is inputted to a subtracter 30A, and is also inputted to a differential compensator 34 of a feed forward system for increasing a response speed. A difference (I−i) calculated by the subtracter 30A is inputted to a proportional calculator 35, and is also inputted to an integration calculator 36 for improving the characteristic of a feedback system. The output from the proportional calculator 35 is inputted to an adder 30B as well as outputs from the differential compensator 34 and the integration calculator 36 are also inputted to the adder 30B. A current control value E which is a result of addition in the adder 30B is inputted to a motor drive circuit 37 as a motor drive signal. Further, a motor current is detected by a motor current detection circuit 38, and the detected motor current i is inputted to the subtracter 30A.

The electric power steering apparatus as described above includes the torque sensor 10 for detecting the steering torque transmitted by a steering shaft in order to apply a steering assist force according to the steering torque to the motor 20. Further, the electric power steering apparatus may include a rotation angle sensor (steering angle sensor) for detecting a steering angle (rotation angle) of the steering shaft to realize an accurate and excellent control, the rotation angle sensor being arranged independently as a sensor. That is, the rotation angle sensor can be retrofitted to a steering mechanism.

When the rotation angle sensor is mounted on the electric power steering apparatus, it is conventionally retrofitted to the steering mechanism from the outside. Accordingly, a size and shape of the rotation angle sensor are restricted by a structure, space and the like of the steering mechanism as well as the rotation angle sensor is disadvantageous in reduction in size and cost.

When the rotation angle sensor is not mounted, the rotation angle is estimated making use of a signal of other sensor, from which a problem arises in controllability.

Further, a brushless DC motor is often used as the motor of the electric power steering apparatus. In the brushless DC motor, since it is necessary to determine timing at which a field current is switched, the power steering apparatus includes a rotor position sensor for detecting a rotation angle position of a rotor. For example, rotation of a magnetized rotary member in a motor is detected as a pulse signal by a magnet detection device (Hall element or the like). Since the rotor position sensor outputs incremental information, it is possible to detect a relative rotational position of the motor from a start of operation thereof. However, it is impossible to detect an absolute value by the rotor position sensor.

More further, in the electric power steering apparatus using the brushless DC motor, an absolute rotation angle of the steering shaft just after the system starts operation cannot be discriminated. This is because that a driver does not always turn on an ignition key in a state that the steering wheel is located at a center as an operation start position. However, when a position of the steering shaft, which satisfies a predetermined condition after the steering apparatus operates, is identified as a neutral position of the steering shaft, an absolute angle of the steering shaft can be detected after the above position is identified. Contemplated as the predetermined condition are, for example, a case in which it can be recognized that a vehicle travels straight, a driver sets a steering torque to a predetermined value or less, and a predetermined period of time has passed, and the like. However, it is difficult to identify an absolute angle of the steering shaft just after traveling starts. Accordingly, a vehicle attitude controller, which prevents slip and the like based on the absolute rotation angle information of the steering shaft, and the like is disadvantageous in that they cannot exhibit a satisfactory function until an absolute angle can be recognized.

An object of the present invention, which was made in view of the circumstances described above, is to provide an electric power steering apparatus that includes a built-in type rotation angle sensor as a standard equipment without being mechanically restricted, rotation angle sensor being capable of detecting an angle with a high resolution by a simple structure. Another object of the present invention is to provide not only an incremental system rotation angle sensor but also a particularly useful absolute value system rotation angle sensor in a compact arrangement.

DISCLOSURE OF THE INVENTION

The present invention relates to an electric power steering apparatus that urges a steering shaft or a rack shaft with an assist load using the drive force of a motor by a transmission mechanism via reduction gears, and the above objects of the present invention will be achieved by that the reduction gears include a rotation angle sensor assembled integrally therewith.

Further, the above objects will be more effectively achieved by arranging the rotation angle sensor as a non-contact type absolute value system sensor; arranging the rotation angle sensor as a contact type absolute value system sensor; arranging the rotation angle sensor as a non-contact type incremental system sensor; arranging the rotation angle sensor as a contact type incremental system sensor; arranging the motor as a brushless DC motor, disposing a rotor position sensor to the brushless DC motor, and enhancing the resolution of a detected rotational position by a combination of the rotation angle sensor and the rotor position sensor; disposing to-be-detected portions of the rotation angle sensor around a wheel of the reduction gears, and disposing a detection means to a base plate fixed in confrontation with the to-be-detected portions; disposing the to-be-detected portions of the rotation angle sensor around a core metal of the wheel of the reduction gear; or disposing the to-be-detected portions around a tooth portion of the wheel of the reduction gear.

Further, the present invention relates to an electric power steering apparatus that urges a steering shaft or a rack shaft with an assist load by a brushless DC motor via reduction gears, and the above objects of the present invention will be achieved by that an incremental system rotation angle sensor is assembled to the reduction gears integrally therewith, and a rotation angle of the steering shaft or the rack shaft is detected in terms of an absolute value based on the relation among an output from a rotor position sensor of the brushless DC motor, an output from the rotation angle sensor, a reduction ratio of the reduction gears, and a rotational velocity of the brushless DC motor.

The above objects of the present invention will be more effectively achieved by disposing to-be-detected portions of the rotation angle sensor around a core metal of a wheel of the reduction gears, disposing the to-be-detected portions of the rotation angle sensor around a tooth portion of the wheel of the reduction gears, or composing the rotation angle sensor of a magnetic sensor.

BRIEF DESCRIPTION OF THE DRAWINGS

FIG. 2 is a pulse output view for explaining an incremental system.

FIGS. 3A to 3C are pulse output views for explaining an absolute value system.

FIGS. 7A and 7B are views explaining an absolute value system rotation angle sensor.

FIG. 8 is a view explaining the absolute value system rotation angle sensor.

BEST MODE FOR CARRYING OUT THE INVENTION

In the present invention, a to-be-detected portion of a rotation angle sensor is assembled in a wheel of reduction gears of an electric power steering apparatus as well as a detection means is disposed on a fixed base plate so as to confront the to-be-detected portion. Accordingly, no special space is necessary to mount the rotation angle sensor. Since the rotation angle sensor is arranged as such a compact built-in type that it is assembled to the reduction gears integrally therewith, the sensor can be reduced in size as well as it can be easily provided as standard equipments. Further, it is possible to enhance resolution when a rotation angle is detected according to a reduction ratio of the reduction gears by combining the rotation angle sensor with an output from a rotor position sensor disposed to a brushless DC motor. The rotation angle sensor may be any of a non-contact type and a contact type, and further may be any of an incremental system and an absolute value system. The present invention provides a compact electric power steering apparatus including a particularly useful absolute value system rotation angle sensor.

Embodiments of the present invention will be explained below with reference to the drawings.

Figure 1B:
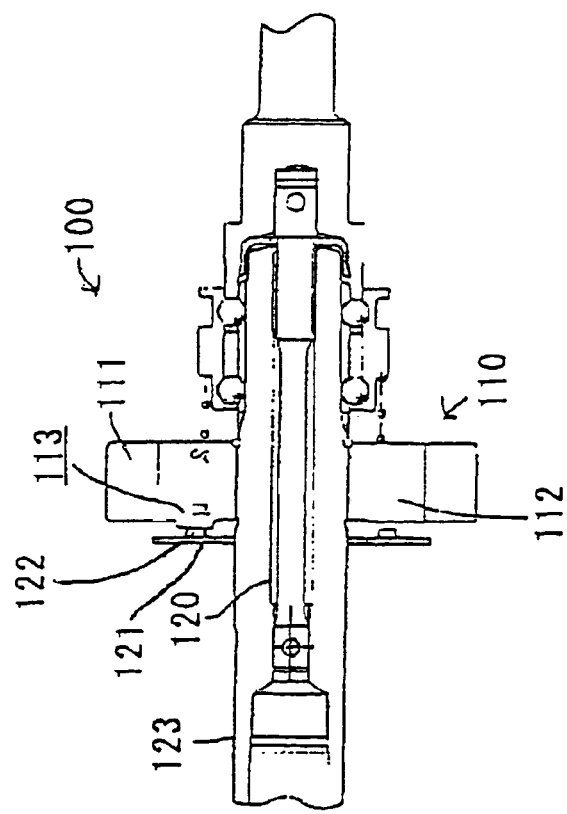
FIGS. 1A and 1B are mechanical views showing reduction gears of an electric power steering apparatus according to the present invention.
Figure 1A:
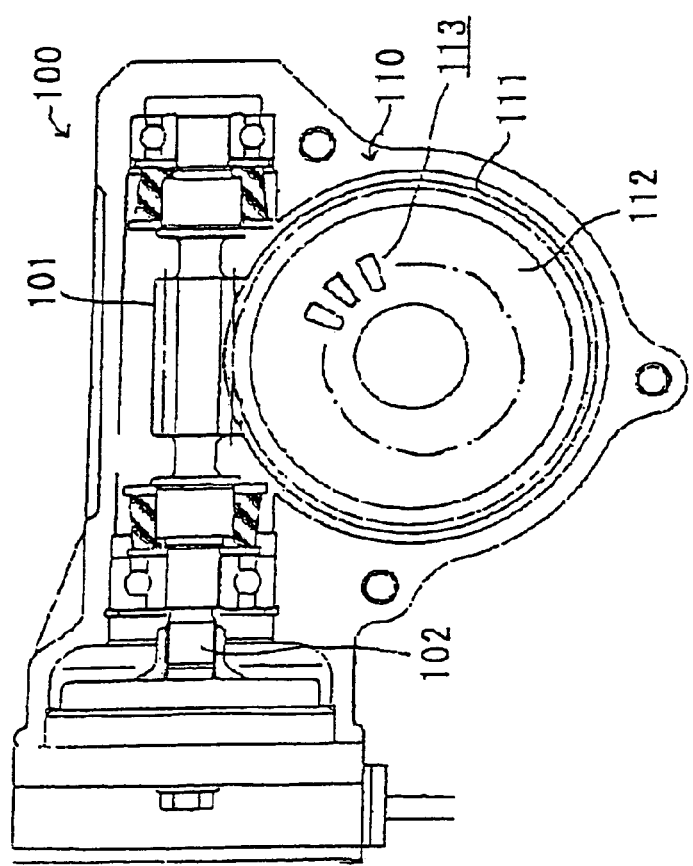

FIGS. 1A and 1B are mechanical views showing a reduction gear portion 100 of the electric power steering apparatus according to the present invention, wherein FIG. 1A is a mechanical plan view in cross section of the reduction gear portion 100, and FIG. 1B is a mechanical side elevational view partly in cross section of the reduction gear portion 100. A worm 101, which is coupled with a rotor shaft 102 of a motor (not shown), is meshed with a tooth portion 111 formed around a core metal 112 of a disc-shaped worm wheel 110 so that the rotation of the motor can be reduced. The disc-shaped core metal 112 is generally composed of steel, and the tooth portion 111 formed around the core metal 112 is generally composed of rigidity-reinforced synthetic resin. The worm wheel 110 is coupled with a steering wheel column 120 so that the rotation of the worm 101 is reduced at a predetermined reduction ratio through the mesh thereof with the tooth portion 111, thereby the reduced rotation of the worm is transmitted to the steering wheel column 120.

Rectangular magnetized portions (N poles or S poles) 113, which act as to-be-detected portions for generating a magnetic force, are circularly disposed on the core metal 112 of the worm wheel 110 in a predetermined width at predetermined intervals. A disc-shaped base plate 121 is disposed to a fixed portion 123 so that the base plate 121 confronts a surface of the worm wheel 110. A Hall IC 122 that acts as a detection means is disposed on the base plate 121. The Hall IC 122 detects the magnetized portions 113 in non-contact therewith and outputs an electric signal.

In the embodiment, the magnetized portions 113 disposed so as to project from a surface of the core metal 112. However, the magnetized portions 113 may be permanent magnets embedded in the core metal 112. Note that FIG. 1A shows a part (3 pieces) of the magnetized portions 113 disposed as described above.

In the above arrangement, when the worm wheel 110 is turned through the worm 101 by steering and the like, the rotation of the magnetized portions 113 disposed around the core metal 112 of the worm wheel 110 is detected by the Hall IC 122 of the base plate 121 in non-contact therewith. When the magnetized portions 113 make a constant speed rotation, the Hall IC 122 outputs a signal having an equally-spaced pulse train as shown in FIG. 2. Since the signal having the pulse train is outputted according to a rotation angle, the rotation angle $\theta$ can be detected by counting the number of pulses of the output pulse train by a reversible counter and the like. That is, the rotational position $\theta$ can be measured by adding the number of pulses when, for example, the magnetized portions 113 turn in an illustrated right direction and by subtracting the number of pulses when the magnetized portions 113 turn in an opposite direction. The embodiment shows the incremental system in which the magnetized portions 113 are circularly disposed at the equal intervals. However, an absolute value system rotation angle sensor can be arranged by disposing the magnetized portions 113 in a plurality of rows while changing the width thereof.

Figure 4:
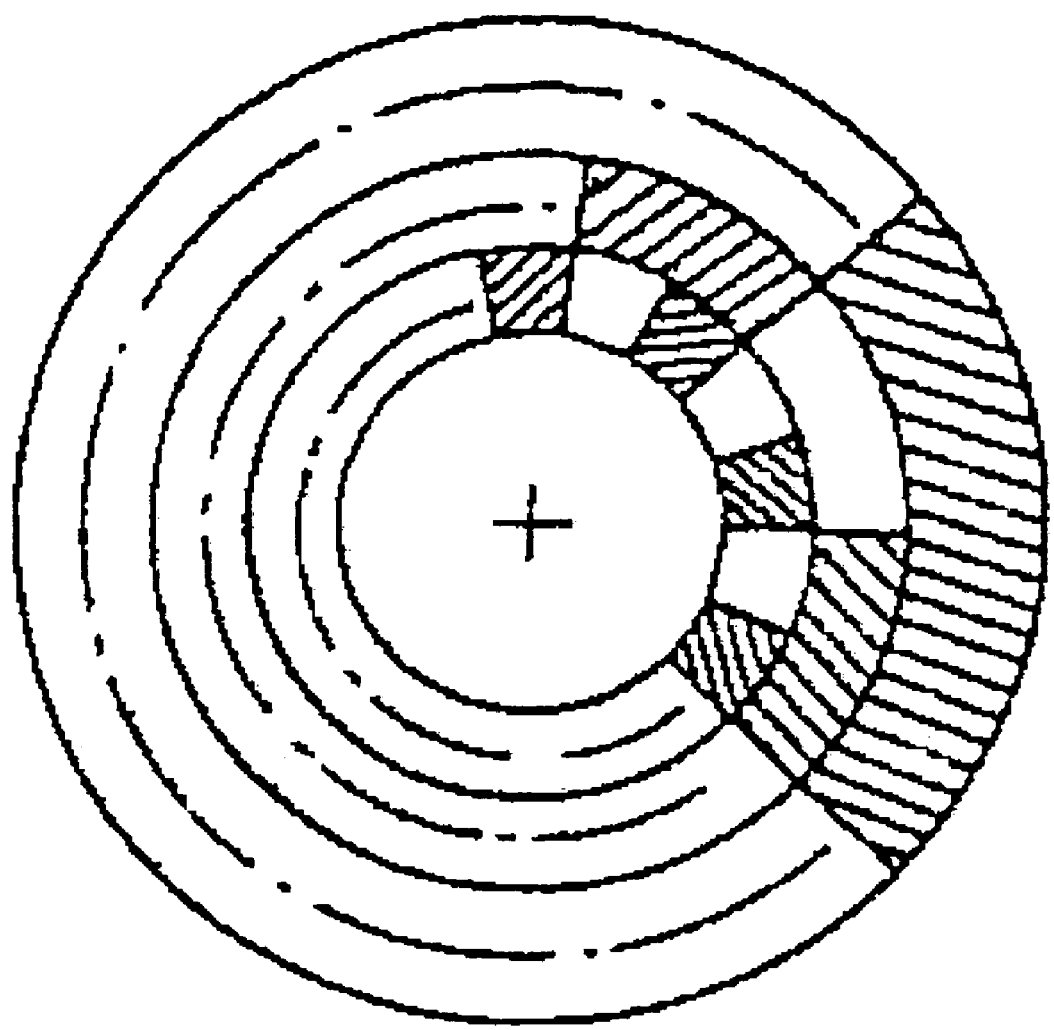
FIG. 4 is a partial view showing an example of a magnetized portion in the absolute value system.

FIGS. 3A to 3C show pulse trains that are output from the rotation angle sensor when the absolute value system is employed. As shown in FIG. 4, the magnetized portions 113 are disposed in a plurality of concentric rows (in the example, 3 rows=3 bits) in confrontation with these pulse trains (in the example, 3 rows=3 bits). That is, the magnetized portions 113 are disposed in the three concentric rows in correspondence to a pulse width shown in FIG. 3. Further, three Hall ICs are radially disposed at positions confronting the respective concentric circles. With the above arrangement, the three Hall ICs detect the three-row magnetized portions 113 and output parallel electric signals as shown in FIG. 3. Accordingly, when the worm wheel 110 rotates, electric signals (3 bits) are outputted in parallel at the timing of the respective rows shown in FIGS. 3A to 3C, thereby the rotation angle $\theta$ can be detected in terms of an absolute value of 3 bits. Note that although FIGS. 3A to 3C and FIG. 4 show the example of the three rows (=3 bits), the number of rows (number of bits) can be arbitrarily set and a code can be arranged by a predetermined code (pure binary code, BCD code, Gray code and the like).

Figures 5A, 5B:
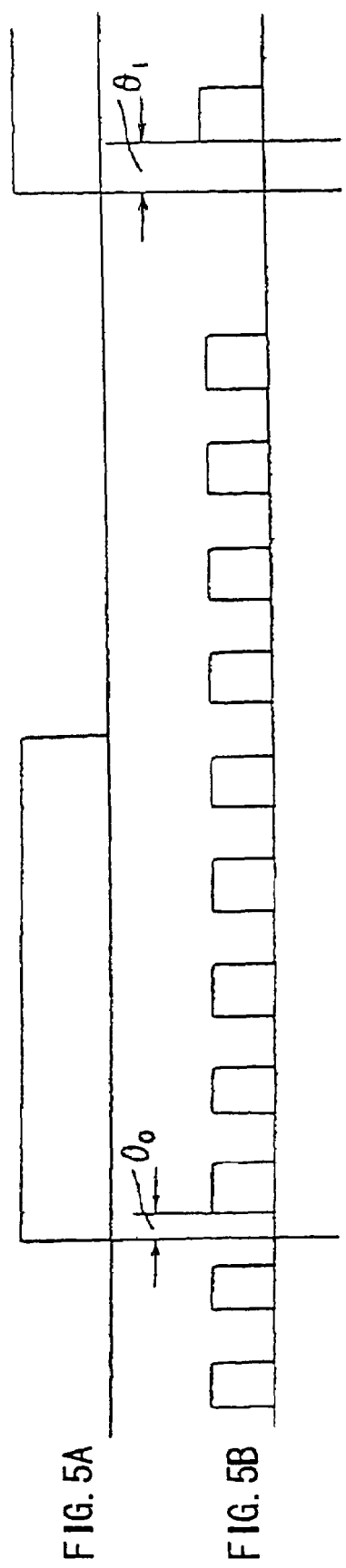
FIGS. 5A and 5B are pulse output views for explaining the absolute value system.

Further, when the motor is the brushless DC motor, the rotor position sensor is attached to the motor to detect a rotor position and to execute a commutation control. Accordingly, an absolute position can be detected by a combination of a pulse signal from the rotor position sensor and an incremental pulse train signal from the rotation angle sensor. FIGS. 5A and 5B show how the absolute position is detected, wherein FIG. 5A shows a pulse train outputted from the rotation angle sensor, and FIG. 5(B) shows a pulse train outputted from the rotor position sensor of the motor. In general, since the pulse train outputted from the rotation angle sensor is not in synchronism with the pulse train output from the rotor position sensor, random phase differences $\theta_0, \theta_1, \ldots$ occur therebetween. Accordingly, a rotation angle can be detected in terms of an absolute value by previously storing the phase differences $\theta_0, \theta_1, \ldots$ in a memory, and taking the positions of the phase differences $\theta_0, \theta_1 \ldots$ into consideration when a rotation angle is detected by counting the pulses of an actual pulse train.

Figures 6A, 6B:
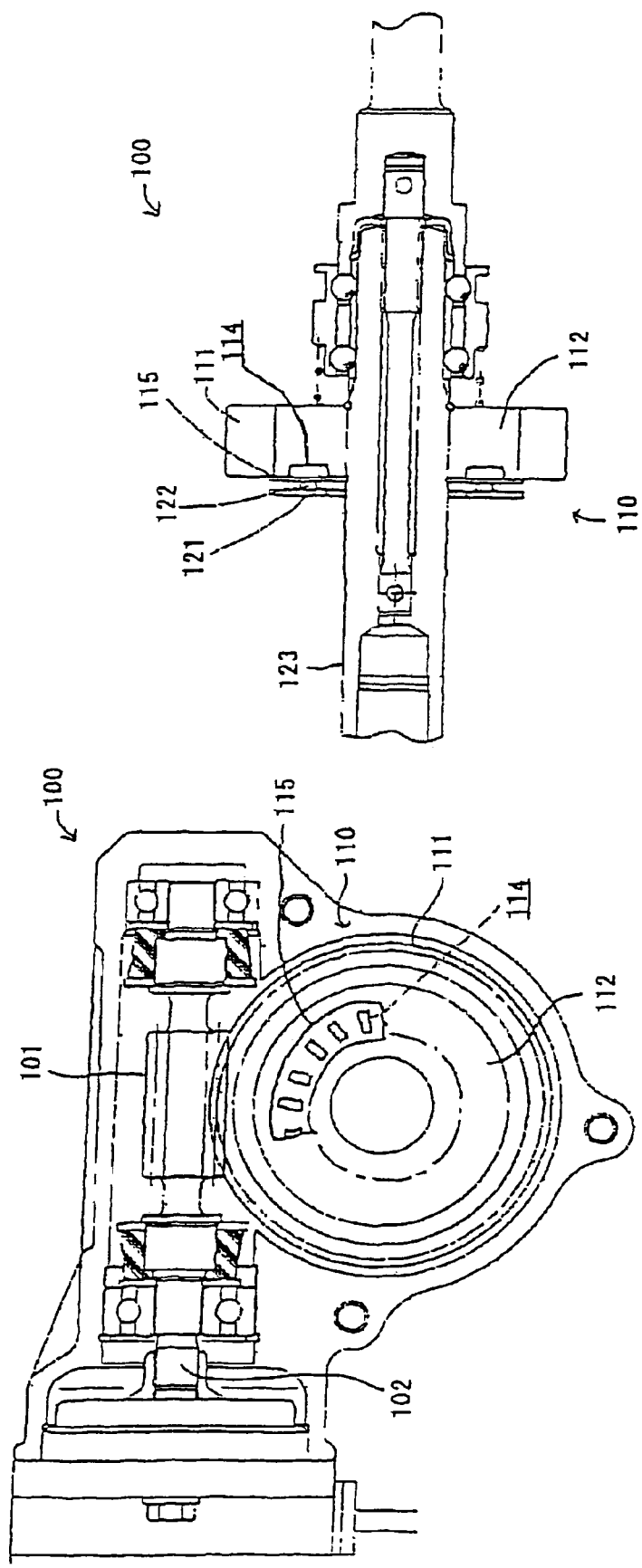
FIGS. 6A and 6B are mechanical views showing another example of the electric power steering apparatus of the present invention.

FIGS. 6A and 6B show other embodiment of the present invention. In this embodiment, permanent magnets 114 are circularly embedded around a core metal 112 of a worm wheel 110 at equal intervals, the permanent magnets 114 having the same size and acting as to-be-detected portions. A non-magnetic plate 115 is layered on the surfaces of the permanent magnets 114 to prevent the removal of the embedded permanent magnets 114. A disc-shaped base plate 121 is fixed to a fixed portion in confrontation with the plate 115 (permanent magnets 114). A Hall IC 122 is disposed on the base plate 121 and acts as a detection means for detecting the magnetic force of the permanent magnets 114 in non-contact therewith. Note that FIG. 6A shows a part of a layout of the permanent magnets 114.

With the above arrangement, when the worm wheel 110 is turned by steering and the like, the permanent magnets 114 embedded around the core metal 112 of the integrator 11 are also detected by the Hall IC 122 of the base plate 121. Then, a rotation angle $\theta$ can be detected by counting the number of pulses of a pulse train outputted from the Hall IC 122 by a counter or the like.

Note that an incremental system rotation angle sensor is arranged when the permanent magnets 114 have a shape and the layout shown in FIG. 6A. However, an absolute value system rotation angle sensor can be arranged by disposing the permanent magnets as shown in, for example, FIG. 4.

Next, an embodiment for detecting an absolute angle by a combination of the rotor position sensor (incremental) of the brushless DC motor and a simple incremental system rotation angle sensor as shown in FIG. 1A or FIG. 6A will be explained.

The number of pulses per turn of a signal having the same pulse intervals, which is used to detect the absolute angle, of an output signal from the rotor position sensor (as shown in FIG. 7A, $n_0$ pulse/turn (=360°) is shown by $n_1$ ($n_1=n_0$ is also acceptable). Then, the number of teeth (number of lines) of a reduction gear coupled with the brushless DC motor is shown by $Z_1$, the number of teeth of a reduction gear fixed on a steering shaft is shown by $Z_2$, and the number of pulses per turn of the incremental system rotation angle sensor disposed on the steering shaft is shown by $n_2$ ($\neq n_1 \times Z_2/Z_1$). When, for example, the number of pulses per turn of a rotor of the rotor position sensor is shown by $n_0=8$, the number of pulses per turn, which is used to detect a steering angle, of the above number of pulses is shown by $n_1=4$, and the numbers of the teeth of the speed reducers are shown by $Z_1=2$, $Z_2=37$, the number of pulses per turn of the steering shaft, which is used to detect the absolute angle of the brushless DC motor, is "$n_1 \times Z_2/Z_1=74$" pulses. In contrast, the number of pulses of the incremental system rotation angle sensor, which is independently disposed on the steering shaft, is set to $n_2=75$ ($\neq 74$) as shown in FIG. 7B.

When the number of pulses is set as described above, the pitch (360/74) of one of the pulses (for example, FIG. 7A) is different from the pitch (360/75) of the other of the pulses (for example, FIG. 7B). Accordingly, a phase difference of one of the pulses offsets little by little with respect to a phase difference of the other of the pulses based on an absolute angle (degree). That is, when a phase difference between one of the pulses and the other pulse adjacent to the one of the pulses is found, the absolute angle (degree) can be detected.

FIG. 8 shows how the absolute angle is detected. In FIG. 8, a relation between a steering angle θ and the number of pulses n is shown by the number of sensor pulses A from the steering shaft and the number of sensor pulses B from the brushless DC motor. When a difference between both the numbers of pulses does not exceed "1" in the characteristics A and B, the absolute value of the steering angle can be detected from the phase difference between the respective characteristics. A one-turn-type absolute value sensor is arranged when a steering angle is set to 360° at a time a difference between the numbers of the pulses is just "1" (phase difference: 360°), and a three-turn-type absolute value sensor is arranged when a steering angle is set to 1080° at the time likewise.

In the embodiment, when the steering shaft turns once, the phase difference gets ahead of a pitch. Accordingly, the phase difference and the absolute angle are repeated in a cycle of one turn, from which the one-turn-type absolute angle sensor can be arranged. Further, a multi-turn-type absolute angle sensor can be arranged when $n_1$, $n_2$, $Z_1$, $Z_2$ satisfy the following relation. That is, the number of pulses $n_1$ does not include the number of teeth $Z_1$ in its factor as well as the number of teeth $Z_2$ does not include the number of teeth $Z_1$ in its factor. When, for example, $n_1=4$, $n_2=73$, $Z_1=3$, $Z_2=55$, the phase difference gets ahead of a pitch when the steering shaft turns three times, from which the three-turn-type absolute angle sensor can be arranged.

Figure 9:
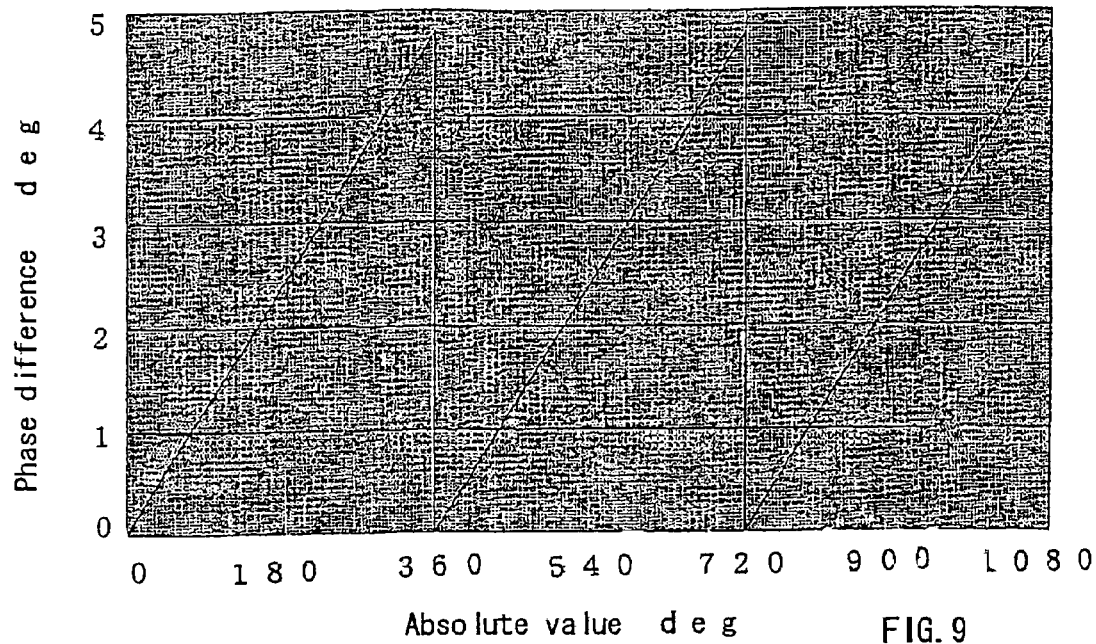
FIG. 9 is a view explaining the absolute value system rotation angle sensor.
Figure 10:
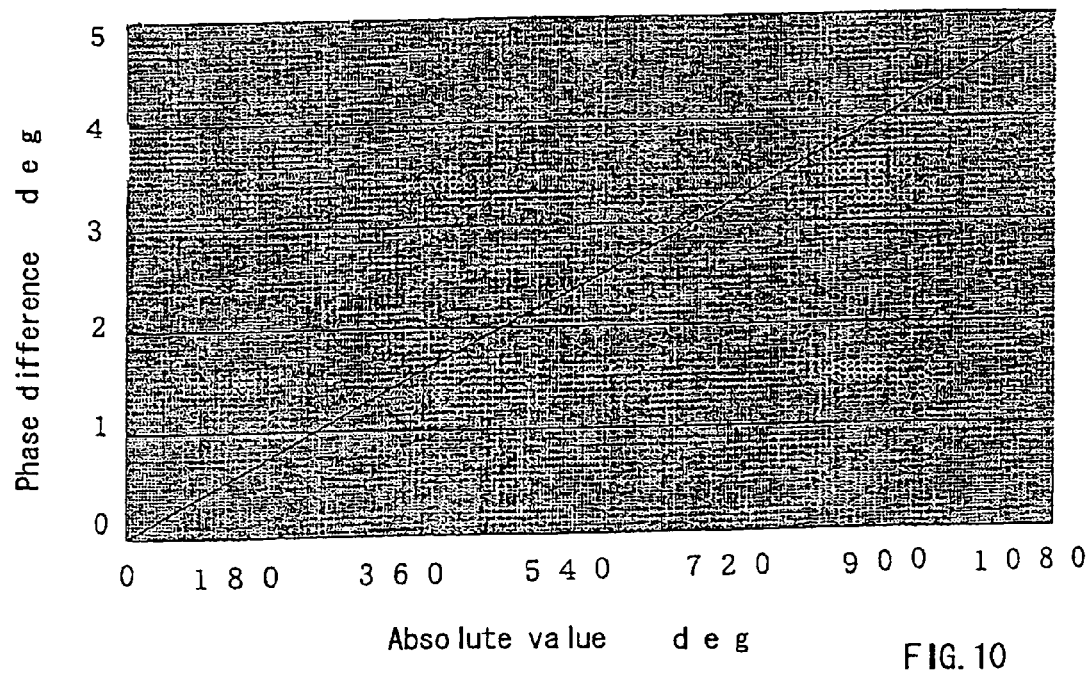
FIG. 10 is a view explaining the absolute value system rotation angle sensor.

FIG. 9 shows an example of $n_1=4$, $n_2=74$, $Z_1=2$, $Z_2=37$. FIG. 10 shows an example of $n_1=4$, $n_2=73$, $Z_1=3$, $Z_2=55$.

In the above examples, when a rotating state of the motor is separately measured and it is determined that an angular acceleration is in a state of constant angular speed having a value equal to or less than a predetermined value, a period of time passed from a time, at which one of the pulses is measured, to a time, at which the other of the pulses is measured, is measured. With the above operation, a phase difference of the pulses can be calculated from the rotational speed of the motor and the measured period of times of both the pulses. Accordingly, an absolute angle at the time can be derived from a relation between a phase difference and an absolute angle which is previously known based on the calculated phase difference.

Figure 11A:
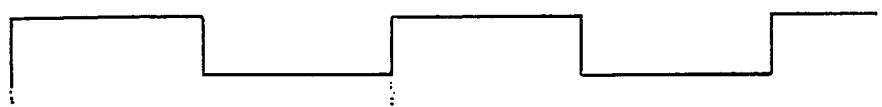
FIGS. 11A and 11B are views explaining the absolute value system rotation angle sensor.
Figure 11B:
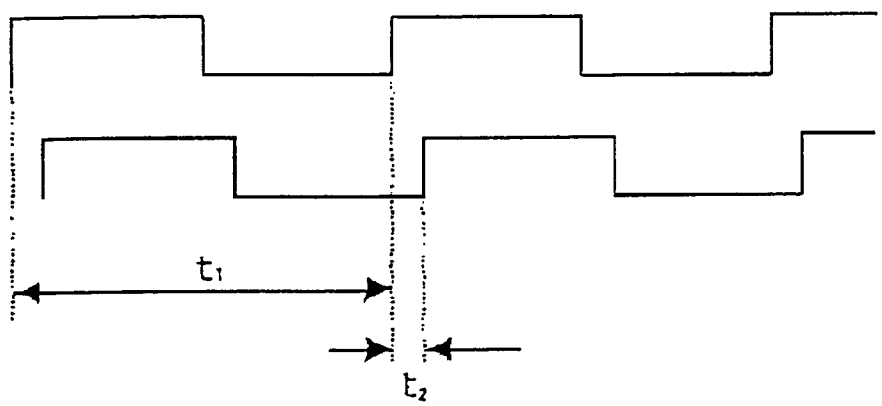
Figure 12:
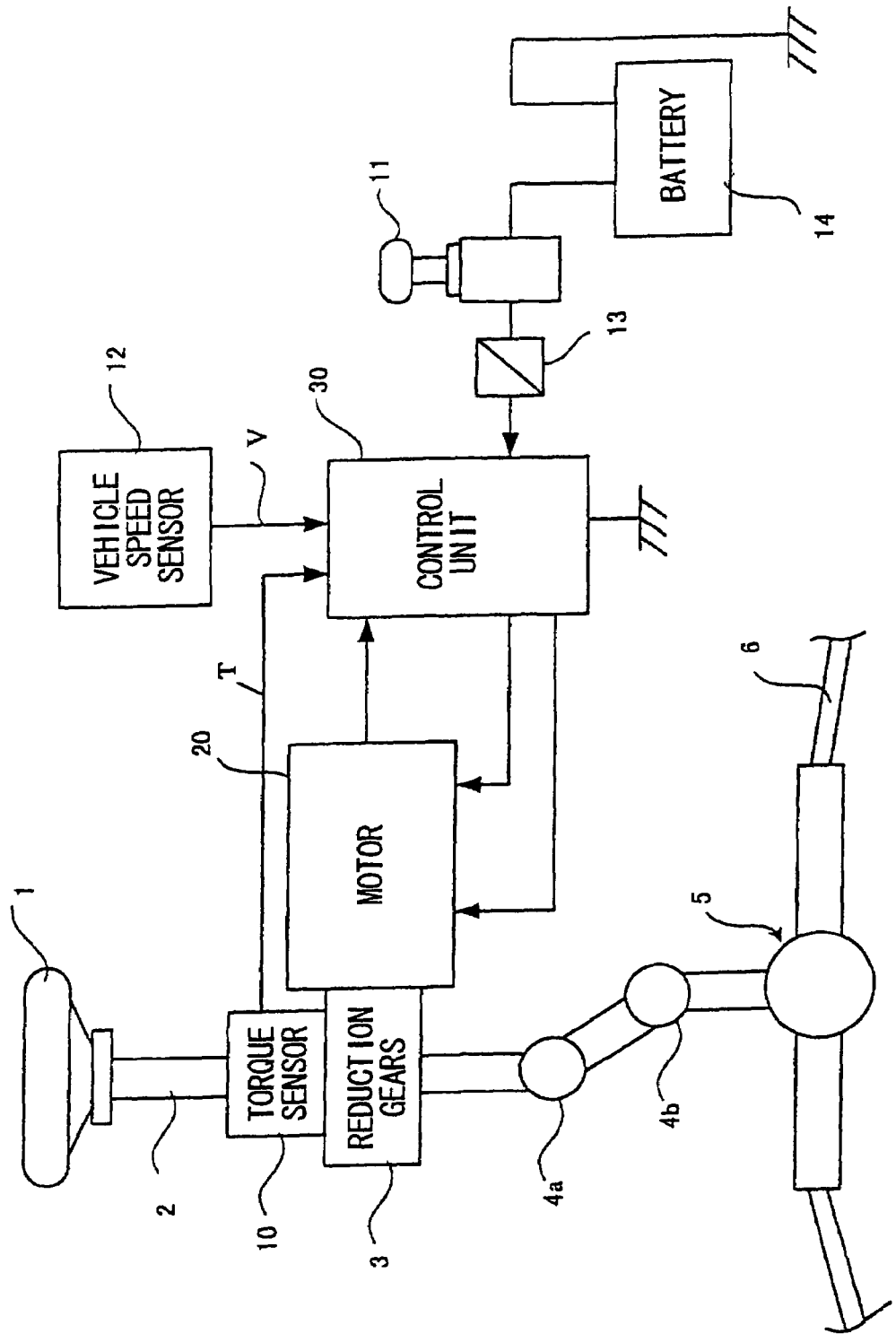
FIG. 12 is a view showing an arrangement of an ordinary electric power steering apparatus.
Figure 13:
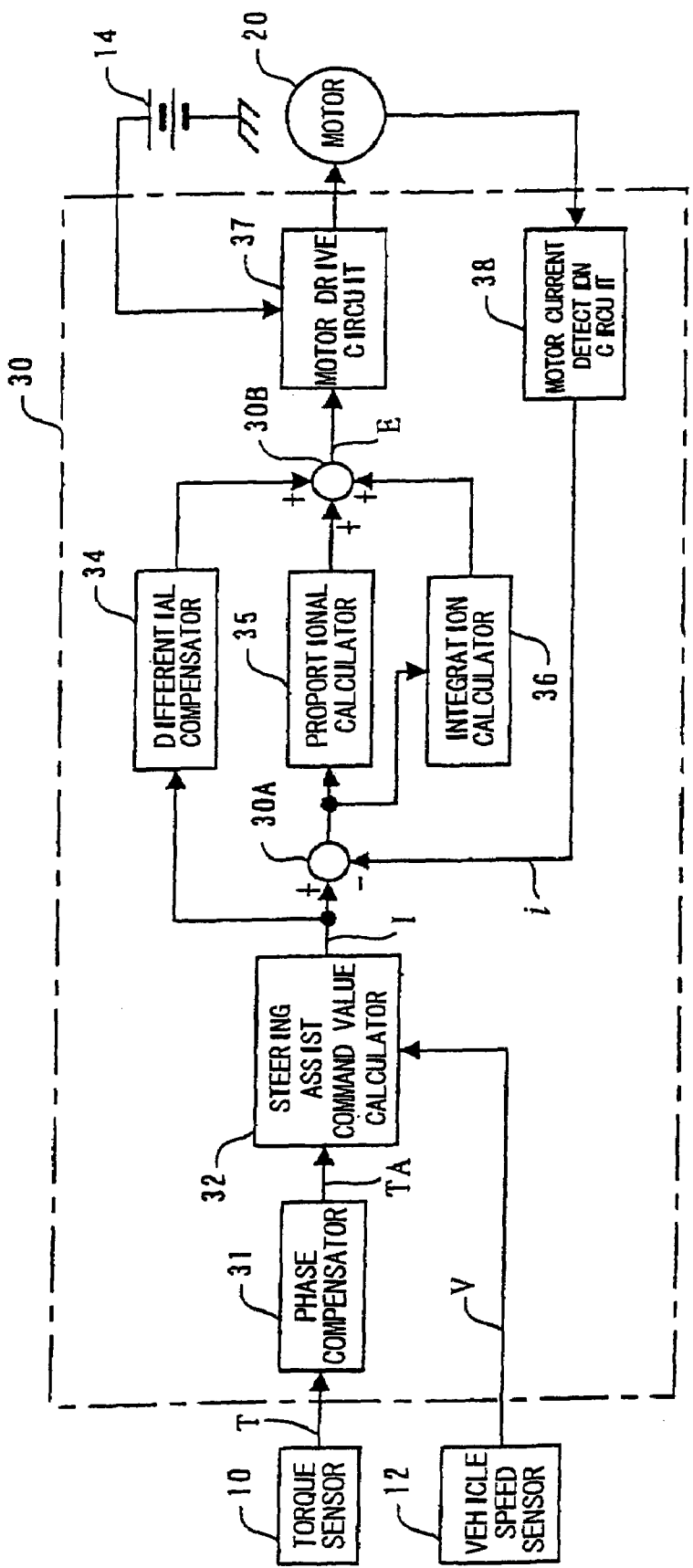
FIG. 13 is a block diagram showing a controller of a conventional electric power steering apparatus.

FIG. 11A shows a sensor pulse waveform from the brushless DC motor, and FIG. 11B shows a sensor pulse waveform from the steering shaft. In the figures, a period of time $t_1$ depends on a motor rotation speed, and a phase difference $t_2$ depends on the motor rotation speed when viewed in terms of a period of time. When it is determined that the motor rotates at a constant angular speed equal to or less than a predetermined value, a phase difference (deg) can be determined by dividing $t_2$ by $t_1$ and normalizing a resultant quotient, thereby an absolute angle can be determined from the relation of the phase difference and the absolute angle which is previously known.

The rotation angle is detected by detecting the magnetic force of the magnetized portions or the permanent magnets by the Hall IC(s) in non-contact therewith in the above explanation. However, non-contact sensors making use of light and static electricity may be also employed, and a light emitting diode, a photo diode, and the like are employed when light is used. Further, a contact type rotation angle sensor using a conductive member, a brush, and the like may be also employed. Further, although the to-be-detected portions are disposed around the core metal of the wheel in the embodiments described above, they can be also disposed around the tooth portion.

INDUSTRIAL APPLICABILITY

As described above, according to the present invention, the to-be-detected portions of the rotation angle sensor is assembled to the wheel of the reduction gear of the electric power steering apparatus as well as the detector is disposed on the base plate in confrontation with the to-be-detected portions. Accordingly, no special space is necessary to mount the rotation angle sensor, and the electric power steering apparatus can be easily standardized by the above arrangement. Further, when the brushless DC motor is employed, the resolution of a detected rotation angle can be enhanced according to a reduction ratio of the reduction gear by a combination the rotation angle sensor and the rotor position sensor disposed to the brushless DC motor.

Further, according to the present invention, not only the incremental system rotation angle sensor but also the absolute value system rotation angle sensor can be easily obtained with a simple arrangement.

The invention claimed is:

1. An electric power steering apparatus that urges a steering shaft or a rack shaft with an assist load using a drive force of a motor by a transmission mechanism via reduction gears, characterized in that the reduction gears include a rotation angle sensor assembled integrally therewith, wherein the motor is a brushless DC motor, a rotor position sensor is disposed to the brushless DC motor, and the resolution of a detected rotational position is enhanced by a combination of the rotation angle sensor and the rotor position sensor.

2. An electric power steering apparatus according to claim 1, wherein the rotation angle sensor is a non-contact type absolute value system sensor.

3. A electric power steering apparatus according to claim 1, wherein the rotation angle sensor is a contact type absolute value system sensor.

4. An electric power steering apparatus according to claim 1, wherein the rotation angle sensor is a non-contact type incremental system sensor.

5. An electric power steering apparatus according to claim 1, wherein the rotation angle sensor is a contact type incremental system sensor.

6. An electric power steering apparatus according to any one of claims 1–5, wherein to-be-detected portions of the rotation angle sensor are disposed around a wheel of the reduction gear, and detection means is disposed to a base plate fixed in confrontation with the to-be-detected portions.

7. An electric power steering apparatus according to claim 6, wherein the to-be-detected portions of the rotation angle sensor are disposed around a core metal of the wheel of the reduction gears.

8. An electric power steering apparatus according to claim 6, wherein the to-be-detected portions of the rotation angle sensor are disposed around a tooth portion of the wheel of the reduction gears.

* * * * *